US008490083B1

(12) United States Patent
Perttunen

(10) Patent No.: US 8,490,083 B1
(45) Date of Patent: Jul. 16, 2013

(54) SOFTWARE FEATURE DEMONSTRATION

(76) Inventor: Cary D. Perttunen, Shelby Township, MI (US)

( * ) Notice: Subject to any disclaimer, the term of this patent is extended or adjusted under 35 U.S.C. 154(b) by 1428 days.

(21) Appl. No.: 11/657,355

(22) Filed: Jan. 24, 2007

Related U.S. Application Data

(63) Continuation of application No. 10/358,558, filed on Feb. 5, 2003, now Pat. No. 7,171,628.

(60) Provisional application No. 60/354,687, filed on Feb. 6, 2002.

(51) Int. Cl.
*G06F 9/445* (2006.01)
*G06F 3/00* (2006.01)

(52) U.S. Cl.
USPC .......................... 717/177; 717/174; 715/705

(58) Field of Classification Search
None
See application file for complete search history.

(56) References Cited

U.S. PATENT DOCUMENTS

| | | | |
|---|---|---|---|
| 5,105,184 A * | 4/1992 | Pirani et al. ............... | 345/629 |
| 5,199,066 A * | 3/1993 | Logan ....................... | 726/29 |
| 5,305,195 A * | 4/1994 | Murphy ..................... | 705/1.1 |
| 5,781,894 A * | 7/1998 | Petrecca et al. ........... | 705/14.4 |
| 5,987,469 A * | 11/1999 | Lewis et al. ............... | 1/1 |
| 6,359,635 B1 * | 3/2002 | Perttunen ................... | 715/834 |
| 6,744,450 B1 * | 6/2004 | Zimniewicz et al. ...... | 717/174 |
| 7,246,150 B1 * | 7/2007 | Donoho et al. ............ | 709/204 |
| 7,500,238 B2 * | 3/2009 | Nestoryak .................. | 717/177 |
| 8,239,858 B2 * | 8/2012 | Bocking et al. ............ | 717/177 |
| 8,386,931 B2 * | 2/2013 | Guckenheimer ........... | 715/705 |
| 2002/0066094 A1 * | 5/2002 | Futakuchi .................. | 717/177 |
| 2003/0084436 A1 * | 5/2003 | Berger et al. .............. | 717/174 |
| 2004/0012637 A1 * | 1/2004 | Alford et al. ............... | 345/772 |
| 2005/0138559 A1 * | 6/2005 | Santos-Gomez et al. .. | 715/705 |
| 2005/0172285 A1 * | 8/2005 | Bourke-Dunphy et al. . | 717/177 |
| 2007/0061723 A1 * | 3/2007 | Ohga et al. ................ | 715/705 |
| 2007/0074202 A1 * | 3/2007 | McMahan et al. ......... | 717/174 |
| 2007/0074205 A1 * | 3/2007 | Tammana et al. .......... | 717/177 |
| 2007/0136667 A1 * | 6/2007 | Gerhart et al. ............. | 715/705 |
| 2008/0052707 A1 * | 2/2008 | Wassel et al. .............. | 717/174 |
| 2008/0288874 A1 * | 11/2008 | Hoyle ........................ | 715/738 |

OTHER PUBLICATIONS

Reidar Conradi and Bernhard Westfechtel; Version Models for Software Configuration Management; [1998]; retrieved online on May 8, 2013; pp. 232-282; Retrieved from the internet <URL: http://delivery.acm.org/10.1145/290000/280280/p232-conradi.pdf?>.*
Per Persson and Younghee Jung; Nokia Sensor: From Research to Product; [May 2005]; retrieved online on May 8, 2013; pp. 2-22; Retrieved from the Internet: <URL: http://delivery.acm.org/10.1145/1140000/1138297/a53-persson.pdf?>.*
He JunHua; Design and implemenation of e-commerce system based on the Web; [2011]; retrieved online on May 8, 2013; pp. 66-68; Retrieved from the Internet <URL: http://ieeexplore.ieee.org/stamp/stamp.jsp?tp=&arnumber=6014390>.*

* cited by examiner

*Primary Examiner* — Thuy Dao
*Assistant Examiner* — Hanh T Bui

(57) ABSTRACT

During installing a first computer software product, a computer system advertises a second computer software product other than the first computer software product and demonstrates a feature of the second computer software product. The feature is responsive to said installing but unnecessary to said installing.

15 Claims, 8 Drawing Sheets

SOFTWARE FEATURE DEMONSTRATION

CROSS-REFERENCE TO RELATED APPLICATIONS

The present application is a continuation of U.S. patent application Ser. No. 10/358,558, filed Feb. 5, 2003, now U.S. Pat. No. 7,171,628, which claims the benefit of U.S. Provisional Application No. 60/354,687, filed Feb. 6, 2002. The above-identified applications are hereby incorporated by reference into the present application.

BACKGROUND OF THE INVENTION

1. Field of the Invention

The present application relates to methods and systems for demonstrating a feature of a computer software product.

2. Description of the Related Art

Many software installation programs provide a graphical bar to indicate progress of an installation. The graphical bar has a length which increases as the installation progresses. The length of the graphical bar ranges between a 0% length to a 100% length to indicate how much of the installation has been completed.

Similarly, some file copying and file downloading features provide a graphical bar to indicate progress of a file copy function or a file download function. The graphical bar has a length which increases as the copying or downloading progresses. The length of the graphical bar ranges between a 0% length to a 100% length to indicate how much of a file has been copied or downloaded.

U.S. Pat. No. 5,987,469 to Lewis et al., which is hereby incorporated by reference into the present disclosure, discloses a method and apparatus for graphically representing information stored in electronic media. Nested rectangles are used to graphically illustrate directories and files in a storage medium. The sizes of the rectangles are proportional to the size of the directory or file represented thereby. The invention suppresses directories or files from being shown if their rectangles would be too small to be accurately perceived.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE PREFERRED EMBODIMENTS

Figure 1:
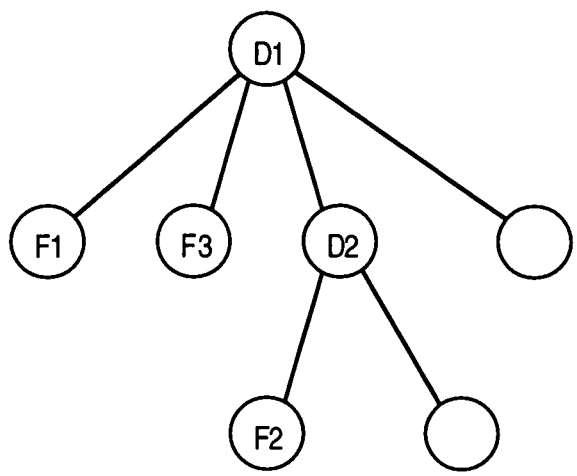
FIG. 1 illustrates an example relationship between three files F1, F2 and F3 and two directories D1 and D2 stored in a computer-readable medium.

Disclosed herein are improved methods and apparatus for graphically representing files and directories being installed to a computer-readable medium. A preview mode is provided by displaying a graphical representation of a hierarchy of files and directories which would result from installing a computer software product to a computer-readable medium. The graphical representation may further comprise a hierarchy of files and directories present on the computer-readable medium prior to the installation. A progress mode is provided by displaying a portion of an annulus sector region which grows as an installation of a computer file progresses. The progress mode further is provided by displaying a graphical representation of a hierarchy of files and directories whose installation has completed.

Each of the two modes provides more transparency to the installation process. Using the preview mode, a user can graphically view how a software installation will modify the computer-readable medium. Further, the user can graphically view how different installation options (e.g. minimum, standard, advanced, or custom) would modify the computer-readable medium before committing to one of the options. Using the progress mode, a user can graphically view how the software installation is progressing.

Based on the installation, a different software product having a feature to display a graphical representation of a hierarchy of files and directories may be advertised and demonstrated. Advertising and demonstrating alternative features which are responsive to the installation but unnecessary to the installation are also within the scope of the present disclosure.

In the context of this disclosure, the terms "folder" and "subfolder" are considered to be synonymous with the terms "directory" and "subdirectory". Further, the term "install" is broadly inclusive of file copying, downloading, uploading and creation acts.

Examples of the computer-readable medium include, but are not limited to, electronic media, magnetic media, optical media, and magneto-optical media. Examples of an electronic medium include, but are not limited to, a flash memory and/or a memory card. Examples of a magnetic medium include, but are not limited to, a magnetic disk and a magnetic tape. The magnetic disk may be embodied by a magnetic floppy diskette or a magnetic hard drive, for example. Examples of an optical medium include, but are not limited to, an optical disk. The optical disk may be embodied by a compact disk or a DVD, for example.

This disclosure first teaches how to graphically represent a hierarchy of files and directories. Preferably, the hierarchy of files and directories can be visually determined using the graphical representation without requiring additional textual information indicating the path. The files and directories are either stored by the computer-readable medium (e.g. present before an installation of a computer software product or present as a result of at least part of the installation) or to be stored by the computer-readable medium (e.g. not currently present but would be present as a result of the installation). Thereafter, methods of providing a preview mode and a progress mode for an installation are disclosed.

FIG. 1 illustrates an example relationship between three files F1, F2 and F3 and two directories D1 and D2 either stored or to be stored in a computer-readable medium. The files F1 and F3 are in the directory D1. The directory D2 is a subdirectory of the directory D1. The directory D1 may further comprise one or more other files and/or one or more other subdirectories. The directory D2 may further comprise one or more subdirectories and/or one or more other files.

Figure 2:
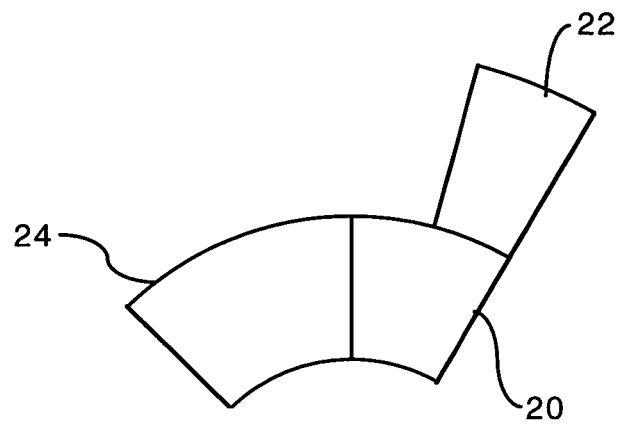
FIG. 2 illustrates an embodiment of a user interface to represent the relationship between the files of FIG. 1.

FIG. 2 illustrates an embodiment of a user interface to represent the relationship between the files of FIG. 1. The user interface comprises a first annulus sector region 20 to represent the file F1, a second annulus sector region 22 to represent the file F2, and a third annulus sector region 24 to represent the file F3. The second annulus sector region 22 is radially-adjacent the first annulus sector region 20. The third annulus sector region 24 is angularly-adjacent the first annulus sector region 20.

In describing shapes in this patent application, the term "annulus sector" is meant to be synonymous with "sector of an annulus". As such, a circular annulus sector is meant to describe a sector of a circular annulus.

Preferably, each annulus sector disclosed herein is an approximately circular annulus sector. The approximately circular annulus sector is definable by a first line segment, a second line segment, a first approximately circular arc, and a second approximately circular arc. The first approximately circular arc is at least partially definable by a first focus point and a first radius. The second approximately circular arc is at least partially definable by a second focus point and a second radius. Preferably, the first focus point and the second focus point are located substantially at the same point. It is further preferred that the first radius and the second radius differ so that the region has a radial width.

The first approximately circular arc is further definable by a first starting angle and either a first ending angle or a first arc angle. The second approximately circular arc is further definable by a second starting angle and either a second ending angle or a second arc angle. Preferably, the first arc angle and/or the second arc angle are non-zero so that the region has an angular width. Also preferably, the first starting angle is substantially the same as the second starting angle, the first ending angle is substantially the same as the second ending angle, and the first arc angle is substantially the same as the second arc angle.

The first line segment and the second line segment are preferably oriented substantially radially with respect to a point. Preferably, this point is located substantially at the first focus point and the second focus point. In this case, it is also preferred that the first line segment be oriented substantially radially with respect to the point at an angle substantially the same as the first starting angle and the second starting angle, and that the second line segment be oriented substantially radially with respect to the point at an angle substantially the same as the first ending angle and the second ending angle.

It is noted that use of the terms "approximate" and "approximately" for the herein-disclosed regions, shapes, and curves include non-perfect representations of said regions, shapes, and curves using a display device and/or an input device. For example, a pixel-based display device can display a plurality of discrete pixels to approximate any of the herein-disclosed regions, shapes, and curves. As another example, a display device may distort an intended region, shape, or curve to produce an approximation thereof. Examples of this distortion include, but are not limited to, a distortion due to pixel aspect ratio, a distortion due to a non-planar display screen, and a distortion due to rasterization.

Approximations of regions, shapes, and curves may also be generated in software or firmware. For example, a curve may be represented by a piecewise approximation. An example of a piecewise approximation of a curve includes, but is not limited to, a piecewise linear approximation. Further examples include a curve being approximated by a simplified equation therefor, and a curve being approximated by a plurality of display points. Examples of ways to approximate a shape or a region include, but are not limited to, using a plurality of points to approximate the shape or region, and using a polygon to approximate the shape or region.

Use of discrete parameter values to represent a region, shape, or curve also may result in an approximation thereof. For example, a circular arc may be represented by an integral center coordinate, an integral radius, an integral start angle, and an integral arc width. In this case, and other cases, either round-off or truncation of parameter values to comply with a discrete representation results in an approximation of a desired region, shape, or curve.

The annulus sector regions 20, 22 and 24 may have an area related to an amount of space either occupied on or to be occupied on the computer-readable medium by its corresponding file. In some modes, each of the annulus sector regions 20, 22 and 24 has a corresponding area proportionally related to an amount of space either occupied on or to be occupied on the computer-readable medium by its corresponding file. In one or more other modes, each of the annulus sector regions 20, 22 and 24 has a corresponding area monotonically but non-proportionally related to the amount of space either occupied on or to be occupied on the computer-readable medium by its corresponding file. For example, in one mode, each of the annulus sector regions 20, 22 and 24 has a corresponding area related to a greater of a minimum value and the amount of space either occupied on or to be occupied on the computer-readable medium by its corresponding file. As another example, in another mode, each of the annulus sector regions 20, 22 and 24 has a corresponding area logarithmically related to the amount of space either occupied on or to be occupied on the computer-readable medium by its corresponding file. Monotonic, non-proportional relationships between the amount of space and the region area are beneficial to mitigate suppression of files from being shown because their regions would be too small to be accurately perceived.

Alternatively, in a further mode, the annulus sector regions 20, 22 and 24 may have approximately the same area regardless of the amount of space either occupied on or to be occupied on the computer-readable medium by its corresponding file.

Figure 3:
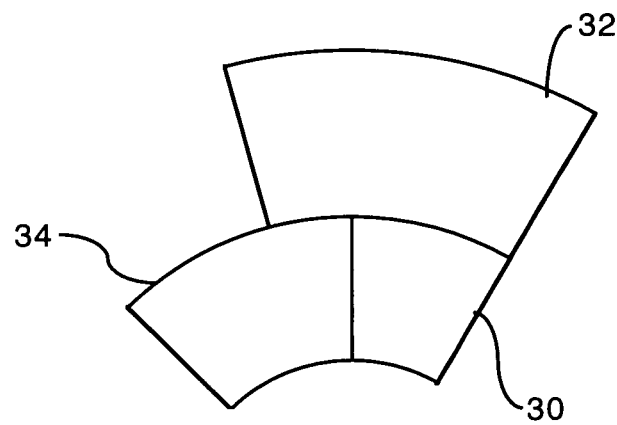
FIG. 3 illustrates another embodiment of a user interface to represent the relationship between the files of FIG. 1.

FIG. 3 illustrates another embodiment of a user interface to represent the relationship between the files of FIG. 1. The user interface comprises a first annulus sector region 30 to represent the file F1, a second annulus sector region 32 to represent the file F2, and a third annulus sector region 34 to represent the file F3. The second annulus sector region 32 is radially-adjacent the first annulus sector region 30. The third annulus sector region 34 is angularly-adjacent the first annulus sector region 30 and radially-adjacent the second annulus sector region 32.

The areas of the annulus sector regions 30, 32 and 34 may be either independent of or related to the amount of space either occupied on or to be occupied on the computer-readable medium by its corresponding file as described with reference to FIG. 2.

Figure 4:
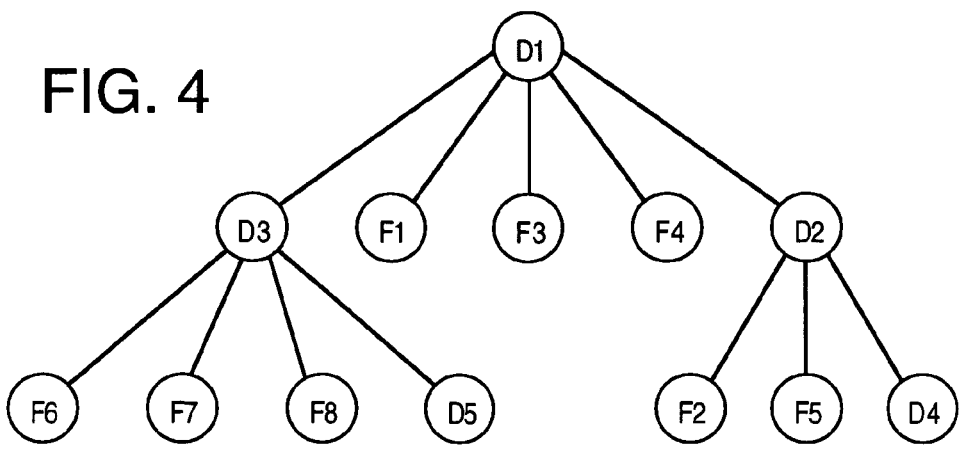
FIG. 4 illustrates another example relationship between files and directories stored in a computer-readable medium.

FIG. 4 illustrates another example relationship between files and directories stored in a computer-readable medium. Files F1, F3 and F4 are all of the files in a directory D1. Directories D2 and D3 are all of the subdirectories of the directory D1. Files F2 and F5 are all of the files in the directory D2. A directory D4 is the only subdirectory of the directory D2. The directory D4 may comprise one or more files and/or one or more subdirectories. Files F6, F7 and F8 are all of the files in the directory D3. A directory D5 is the only subdirectory of the directory D3. The directory D5 may comprise one or more files and/or one or more subdirectories.

Figure 5:
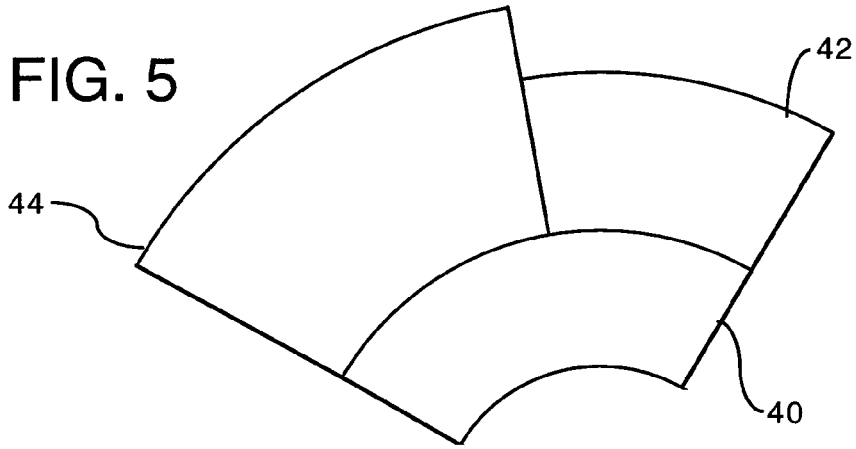
FIG. 5 illustrates an embodiment of a user interface to represent the directories D1, D2 and D3 of FIG. 4.

FIG. 5 illustrates an embodiment of a user interface to represent the directories D1, D2 and D3 of FIG. 4. The user interface comprises a first annulus sector region 40 to represent the directory D1, a second annulus sector region 42 to represent the directory D2, and a third annulus sector region 44 to represent the directory D3. The second annulus sector region 42 is radially-adjacent the first annulus sector region 40. The third annulus sector region 44 is angularly-adjacent the second annulus sector region 42, and radially-adjacent the first annulus sector region 40.

The first annulus sector region 40 has an area based on an amount of space either occupied on or to be occupied on the computer-readable medium by all files in the directory D1 non-inclusive of all subdirectories of the directory D1. Thus, the area of the first annulus sector region 40 is based on the amount of space either occupied on or to be occupied on the computer-readable medium by the files F1, F3 and F4.

The second annulus sector region 42 has an area based on an amount of space either occupied on or to be occupied on the computer-readable medium by all files in the directory D2 non-inclusive of all subdirectories of the directory D2. Thus, the area of the second annulus sector region 42 is based on the amount of space either occupied on or to be occupied on the computer-readable medium by the files F2 and F5.

The third annulus sector region 44 has an area based on an amount of space either occupied on or to be occupied on the computer-readable medium by all files in the directory D3 non-inclusive of all subdirectories of the directory D3. Thus, the area of the third annulus sector region 44 is based on the amount of space either occupied on or to be occupied on the computer-readable medium by the files F6, F7 and F8.

In some modes, each area is proportionally related to the corresponding amount of space either occupied on or to be occupied on the computer-readable medium by all files in the corresponding directory non-inclusive of all subdirectories of the corresponding directory. In one or more other modes, each area is monotonically but non-proportionally related to the corresponding amount of space either occupied on or to be occupied on the computer-readable medium by all files in the corresponding directory non-inclusive of all subdirectories of the corresponding directory. For example, in one mode, each area is related to a greater of a minimum value and the corresponding amount of space either occupied on or to be occupied on the computer-readable medium by all files in the corresponding directory non-inclusive of all subdirectories of the corresponding directory. As another example, in another mode, each area is logarithmically related to the corresponding amount of space either occupied on or to be occupied on the computer-readable medium by all files in the corresponding directory non-inclusive of all subdirectories of the corresponding directory. Monotonic, non-proportional relationships between the amount of space and the region area are beneficial to mitigate suppression of directories from being shown because their regions would be too small to be accurately perceived.

Alternatively, in a further mode, the annulus sector regions 40, 42 and 44 may have approximately the same area.

Any one or more of the annulus sector regions 40, 42 and 44 may be partitioned into a plurality of sub-regions. Each of the sub-regions represents a corresponding one of the files in a directory. Each of the sub-regions may have a corresponding area based on an amount of space either occupied on or to be occupied on the computer-readable medium by its corresponding one of the files. Examples of space-based areas are described with reference to FIG. 2. Alternatively, each of the sub-regions may have about the same area regardless of the amount of space either occupied on or to be occupied on the computer-readable medium by its corresponding one of the files.

Figure 6:
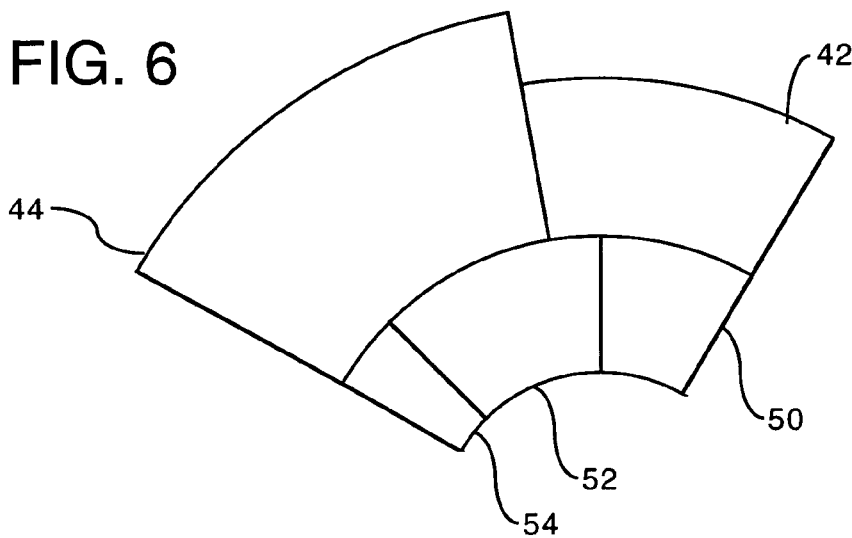
FIG. 6 illustrates an embodiment of a user interface having a partitioned annulus sector region to represent a plurality of files.

FIG. 6 illustrates an embodiment of a user interface having a partitioned annulus sector region to represent a plurality of files. The user interface has the same annulus sector regions 40, 42 and 44 as in FIG. 5 to represent the directories D1, D2 and D3 in FIG. 4. In contrast to FIG. 5, the annulus sector region 40 is partitioned into three sub-regions 50, 52 and 54. The sub-region 50 represents the file F1. The sub-region 52 represents the file F3. The sub-region 54 represents the file F4.

The sub-region 50 has an area monotonically-related to the size of the file F1. The sub-region 52 has an area monotonically-related to the size of the file F3. The sub-region 54 has an area monontonically-related to the size of the file F4. Thus, since the sub-region 50 has an area greater than the areas of the sub-regions 52 and 54, the file F1 has a size greater than the files F3 and F4.

Any of the herein-described regions may be visibly displayed to provide a visible representation of the information either stored by or to be stored by the computer-readable medium, and/or used to provide an input interface to allow a user-initiated selection of a directory or a file. Optionally, the regions may be printed to produce a hard copy representation of the information stored by the computer-readable medium.

In general, the files and directories either stored by or to be stored by a computer-readable medium may be interrelated by a tree. An embodiment of a method of determining parameters defining the regions uses a tree which interrelates only the directories. Each node of the tree represents a directory. An edge between two nodes associates a subdirectory with its parent directory. The tree may relate all of the directories, or alternatively, a subset of the directories.

In tree terminology, a first node is said to be adjacent to a second node if there is an edge from the first node to the second node. A path is definable by a sequence of nodes wherein each consecutive pair of nodes in the sequence is adjacent. The tree has a unique path from a designated node, called a root node, to each of its other nodes. The root node may represent either a directory, an actual or virtual drive (e.g. "a:" or "c:"), or the computer-readable medium itself (e.g. an actual hard drive, a diskette, a memory card, a compact disk, or a DVD).

Further in tree terminology, nodes having the same parent node are called siblings. Nodes of a tree with no children are called leaf nodes. Nodes having at least one child are called internal nodes. A level number of a node is defined as the number of edges in the path between the node and the root node. The height of the tree is the largest level number of any node. Keeping with the aforementioned tree terminology, directories having the same parent directory are called sibling directories, directories having no subdirectories in the tree are called leaf directories, and directories having at least one subdirectory in the tree are called internal directories.

It is noted that alternative terminology may be used to describe the tree. Examples of synonyms of "node" include, but are not limited to, "vertex" and "state". Examples of synonyms of "edge" include, but are not limited to, the terms "arc" and "link". Therefore, the herein-disclosed methods, articles, apparatus, and examples should not be limited by the selected terminology used to describe the tree.

As those having ordinary skill will recognize, various computer-readable data structures can be used to represent the tree in a computer-readable form using a computer-readable medium.

The root node may be represented by either a concave shape, such as an annulus sector, or a substantially convex shape. Preferably, the substantially convex shape is at least partially defined by at least a portion of an approximate circle. Examples of the substantially convex shape having this preferred form include, but are not limited to, an approximate sector of a circle, and approximately an entire circle. It is noted that a shape need not be precisely convex to be substantially convex. Examples of insubstantial concavities in a substantially convex shape include, but are not limited to, those which may result from an approximation of the shape or a curve which at least partially defines the shape, and those present where endpoints of two curves imprecisely meet.

Each non-root node in the tree is represented by a corresponding concave region such as an annulus sector.

Each region has a controlled area based upon a predetermined value, herein referred to as a weight, associated with the node. Numerous alternatives are contemplated for assigning the weight to a directory. Each alternative provides a mode of operation. Examples of the various modes are as follows.

Mode 1: The weight of a directory is equal to an amount of space either occupied on or to be occupied on the computer-readable medium by all files in the directory non-inclusive of all subdirectories of the directory.

Mode 2: The weight of a directory is equal to a sum of max{minimum value, amount of space either occupied on or to be occupied on the computer-readable medium by a file} for all files in the directory non-inclusive of all subdirectories of the directory. The minimum value mitigates suppression of files from being displayable because their sub-regions would be too small to be accurately perceived.

Mode 3: The weight of a directory is equal to a greater of a minimum value and the corresponding amount of space either occupied on or to be occupied on the computer-readable medium by all files in the directory non-inclusive of all subdirectories of the directory. The minimum value mitigates suppression of directories from being displayed because their regions would be too small to be accurately perceived.

Mode 4: The weight of a directory is equal to a logarithm of an amount of space either occupied on or to be occupied on the computer-readable medium by all files in the directory non-inclusive of all subdirectories of the directory.

Mode 5: The weight of a directory is equal to a sum of log(amount of space either occupied on or to be occupied on the computer-readable medium by a file) for all files in the directory non-inclusive of all subdirectories of the directory. The minimum value mitigates suppression of files from being displayable because their sub-regions would be too small to be accurately perceived.

Mode 6: Each of the directories is equally-weighted. In this mode, the hereinafter-described computations can be simplified by assigning a weight of one to each of the directories. A plurality of regions, each having the same area, results in this mode.

Mode 7: The weight of a directory is equal to a count of all files in the directory non-inclusive of all subdirectories of the directory.

Figure 7:
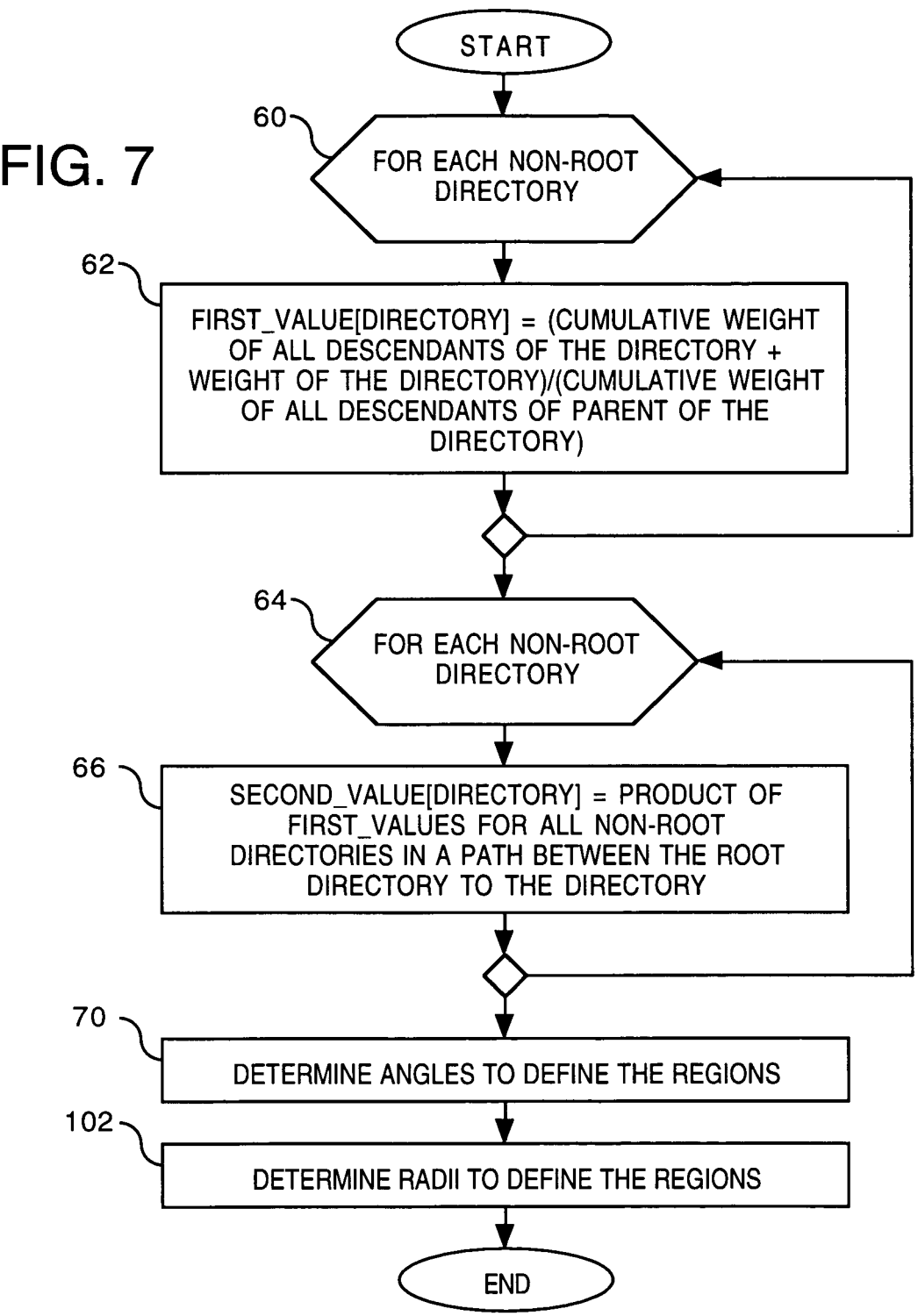
FIG. 7 is a flow chart of an embodiment of a method of determining regions to represent tree-related directories.

FIG. 7 is a flow chart of an embodiment of a method of determining regions to represent tree-related directories. The method may be used to determine the regions shown in FIGS. 2-3 and 5-6.

For each non-root directory in the tree (as indicated by block 60), a first value associated with the directory is determined (as indicated by block 62). The first value is based on $(W+C1)/C2$, wherein W denotes a weight of the directory, C1 denotes a cumulative weight of all descendants of the directory, and C2 denotes a cumulative weight of all descendants of a parent of the directory. It is noted that for the aforementioned mode 1, the first value is based on an amount of space either occupied on or to be occupied on the computer-readable medium by all files and all subdirectories in the directory divided by an amount of space either occupied on or to be occupied on the computer-readable medium by all subdirectories of the parent of the directory.

For each non-root directory in the tree (as indicated by block 64), a second value associated with the directory is determined (as indicated by block 66). The second value is equal to a product of the first values for all non-root directories in a tree-defined path from the root directory to the directory.

As indicated by block 70, the method comprises determining angles to define the regions based on the second values. The angles may be based on an overall angular width of an aggregation of the regions, herein denoted by MAXIMUM_ARC_ANGLE, and an initial starting angle of the aggregation of the regions, herein denoted by FIRST_START_ANGLE. In general, the MAXIMUM_ARC_ANGLE value can be any value, such as less than 180 degrees, about equal to 180 degrees, greater than 180 degrees but less than 360 degrees, or about equal to 360 degrees. If the MAXIMUM_ARC_ANGLE is equal to 360 degrees, the region representing the root directory is a circle. If the MAXIMUM_ARC_ANGLE is less than 360 degrees, the region representing the root directory is a sector of a circle having a start angle and an end angle.

Optionally, the MAXIMUM_ARC_ANGLE is inversely related to an amount of unoccupied space which will result on the computer-readable medium after the installation. For example, the MAXIMUM_ARC_ANGLE can be selected to be equal to 360 degrees times a total amount of space either occupied by or to be occupied by the directories in the tree divided by a total amount of space of the computer-readable medium. This option allows a user to gauge, prior to the installation, the amount of unoccupied space on the computer-readable medium which will remain if the installation is performed.

The start angle for the root directory is set to the FIRST_START_ANGLE value. The end angle for the root directory is set to a sum of the FIRST_START_ANGLE value and the MAXIMUM_ARC_ANGLE value. A resulting arc angle for the root directory is equal to the MAXIMUM_ARC_ANGLE value.

Figure 8:
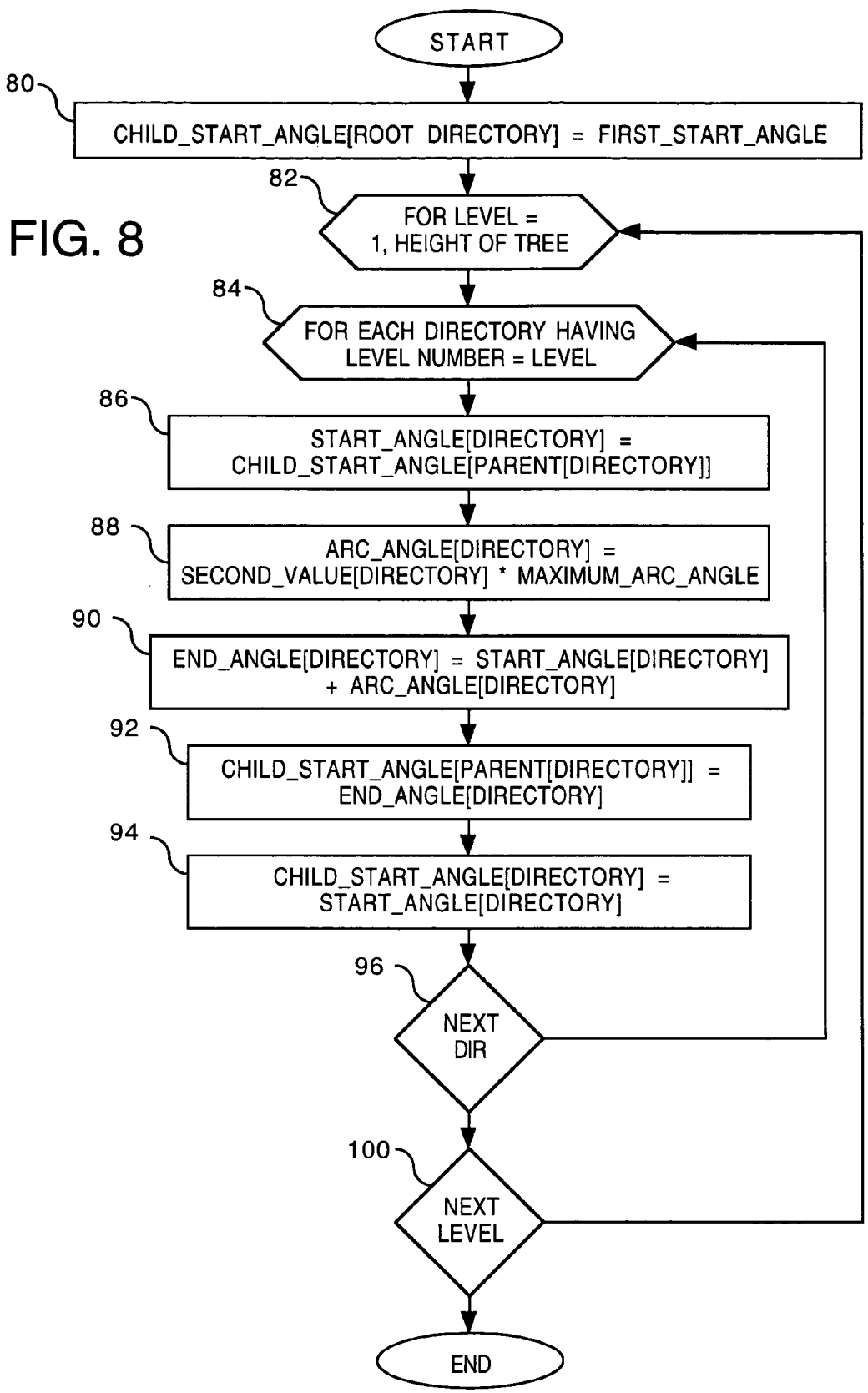
FIG. 8 is a flow chart of an embodiment of a method of determining angles associated with non-root directories.

An embodiment of a method of determining angles associated with non-root directories is shown in FIG. 8. As indicated by block 80, the method comprises initializing a variable, herein denoted by CHILD_START_ANGLE, of the root directory. The CHILD_START_ANGLE of the root directory is initialized to be equal to FIRST_START_ANGLE. As indicated by block 82, a variable denoted as LEVEL is prepared to increment from 1 to a height of the tree. As indicated by block 84, the method comprises performing acts for each directory having a level number equal to the LEVEL variable. The acts comprise determining a start angle for the directory (block 86), an arc angle for the directory (block 88), and an end angle for the directory (block 90). The start angle is equal to the CHILD_START_ANGLE value of the parent of the directory. The arc angle is equal to a product of the second value of the directory and the MAXIMUM_ARC_ANGLE value. The end angle is equal to a sum of the start angle and the arc angle. Alternatively, the end angle may be equal to the start angle minus the arc angle.

The acts further comprise updating the CHILD_START_ANGLE of the parent of the directory (block 92), and setting the CHILD_START_ANGLE of the directory (block 94). The CHILD_START_ANGLE of the parent of the directory is updated to be equal to the end angle for the directory. The CHILD_START_ANGLE of the directory is set to the start angle for the directory. Optionally, the act in block 94 is omitted if the directory is a leaf directory.

As indicated by block 96, flow of the method is directed back to block 84 if there is a further directory having a level number equal to the LEVEL variable. Otherwise, flow of the method is directed to block 100. From block 100, if there is a further level to process, flow of the method is directed to block 82 wherein the LEVEL variable is incremented. If there are no further levels to process, the method is completed.

Referring back to FIG. 7, an act of determining radii to define the regions is performed as indicated by block 102. Preferably, the region representing the root directory is definable by a single radius. Thus, if the MAXIMUM_ARC_ANGLE is equal to 360 degrees, the region representing the root directory may be a circle; and if the MAXIMUM_ARC_ANGLE is less than 360 degrees, the region representing the root directory may be a sector of a circle.

Figure 9:
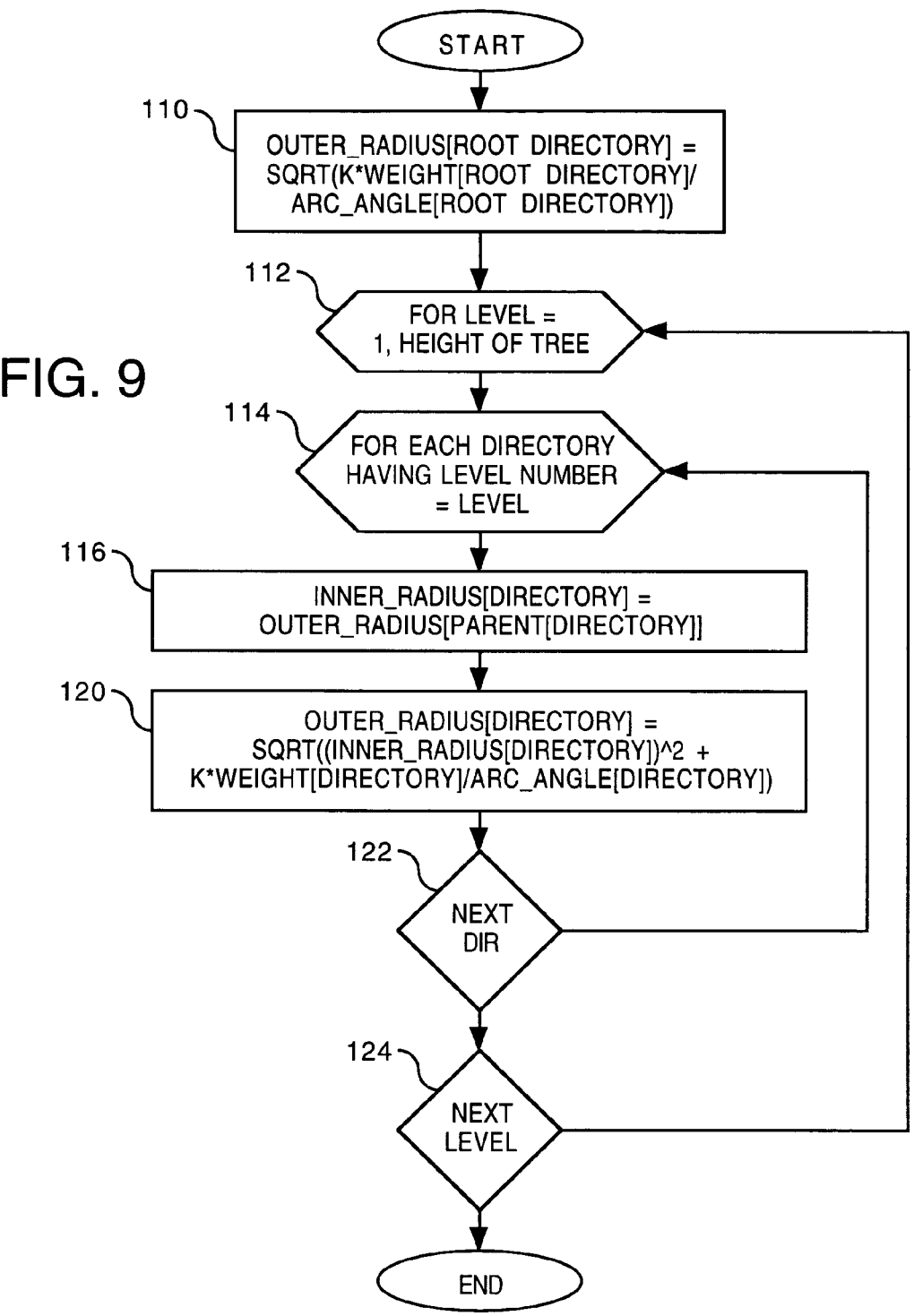
FIG. 9 is a flow chart of an embodiment of a method of determining radii to define the regions.

FIG. 9 is a flow chart of an embodiment of a method of determining radii to define the regions. The radii may be based on an overall radius of the aggregate of the regions, herein denoted by MAXIMUM_RADIUS.

Optionally, the MAXIMUM_RADIUS is inversely related to an amount of unoccupied space on the computer-readable medium which will result after the installation. For example, the MAXIMUM_RADIUS can be selected to be equal to a product of an upper bound value and a square root of a quotient of a total amount of space occupied by the directories in the tree divided by a total amount of space of the computer-readable medium. This option allows a user to gauge, prior to the installation, the amount of unoccupied space on the computer-readable medium which will remain if the installation is performed.

To simplify subsequent computations, a constant K defined as the MAXIMUM_ARC_ANGLE times the square of the MAXIMUM_RADIUS, divided by the cumulative weight of all directories in the tree, is determined.

$$K = \text{MAXIMUM\_ARC\_ANGLE} * (\text{MAXIMUM\_RADIUS})^2 / (\text{cumulative weight of all directories in the tree})$$

As indicated by block 110, an outer radius for the root directory is determined. The outer radius for the root directory is equal to the square root of: K times the weight of the root directory divided by the arc angle for the root directory.

As indicated by block 112, a variable denoted as LEVEL is prepared to increment from 1 to a height of the tree. As indicated by block 114, the method comprises performing acts for each directory having a level number equal to the LEVEL variable. The acts comprise determining an inner radius for the directory (block 116) and an outer radius for the directory (block 120). The inner radius for the directory is determined to be equal to the outer radius for the parent of the directory. The outer radius for the directory is equal to the square root of: the sum of square of the inner radius of the directory and K times the weight of the directory divided by the arc angle for the directory. Optionally, if the directory is a leaf directory, the outer radius of the directory can be determined to be equal to the MAXIMUM_RADIUS value without performing the aforementioned computation.

As indicated by block 122, flow of the method is directed back to block 114 if there is a further directory having a level number equal to the LEVEL variable. Otherwise, flow of the method is directed to block 124. From block 124, if there is a further level to process, flow of the method is directed to block 112 wherein the LEVEL variable is incremented. If there are no further levels to process, the method is completed.

Each non-root directory is represented by a corresponding region definable with respect to a common focus point by the start angle, end angle, inner radius, and outer radius. The root directory is represented by a region definable with respect to the common focus point by an outer radius, and optionally a start angle and an end angle.

Optionally, one or more of the regions are partitioned into a plurality of sub-regions. Each sub-region represents a corresponding one of the files in a directory. Each sub-region may have an area based on the size of its corresponding file.

In a first partitioning mode, all regions whose corresponding directory has two or more files are partitioned into sub-regions. In a second partitioning mode, only user-selected regions are partitioned into sub-regions. A region may be user-selected by a mouse-click event or a mouse-over event, for example.

A region can be partitioned along its angular width and/or its radial width such that each sub-region is an approximately annulus sector as described herein. Examples of partitioning a region into sub-regions for the herein-disclosed modes include, but are not limited to, the following.

Modes 1 and 3: Each sub-region $R_i$ in a region R has a corresponding angular width based on $A_R * S_i / S_R$, where $A_R$ is the angular width of the region R, $S_i$ is an amount of space either occupied on or to be occupied on the computer-readable medium by the $i^{th}$ file in the directory, and $S_R$ is an amount of space either occupied on or to be occupied on the computer-readable medium by all files in the directory non-inclusive of all subdirectories of the directory.

Mode 2: Each sub-region $R_i$ in a region R has a corresponding angular width based on $A_R * S_i / S_R$, where $A_R$ is the angular width of the region R, $S_i$ is max{minimum value, amount of space either occupied on or to be occupied on the computer-readable medium by the $i^{th}$ file}, and $S_R$ is sum of max{minimum value, amount of space either occupied on or to be occupied on the computer-readable medium by a file} for all files in the directory non-inclusive of all subdirectories of the directory.

Mode 5: Each sub-region $R_i$ in a region R has a corresponding angular width based on $A_R * S_i / S_R$, where $A_R$ is the angular width of the region R, $S_i$ is log(amount of space either occupied on or to be occupied on the computer-readable medium by the $i^{th}$ file in the directory), and $S_R$ is a sum of log(amount of space either occupied on or to be occupied on the computer-readable medium by all files in the directory non-inclusive of all subdirectories of the directory).

Modes 6 and 7: Each sub-region $R_i$ in a region R has a corresponding angular width based on $A_R/N_R$, where $A_R$ is the angular width of the region R, and $N_R$ is the number of files in the directory.

The resulting aggregation of regions has many desirable qualities. For any tree configuration, the herein-disclosed method provides a one-to-one correspondence between the directories and the regions. By one-to-one correspondence, it is meant that each directory is represented by one and only one of the regions, and each of the regions represents one and only one of the directories. Further, a one-to-one correspondence between files in a directory and sub-regions in a region representing the directory is produced if the region is partitioned.

Further, the aggregation of regions is contiguous for any tree configuration, which in the context of this disclosure is broadly inclusive of describing the regions as being either neighboring or adjacent throughout the aggregation. For example, adjacent pairs of regions which are spaced slightly apart are considered to be contiguous.

Still further, the aggregation of regions defines an identifiable boundary at its periphery for any tree configuration. If the MAXIMUM_ARC_ANGLE value is 360 degrees, the boundary comprises a circle having a radius equal to the MAXIMUM_RADIUS value. If the MAXIMUM_ARC_ANGLE value is less than 360 degrees, the boundary comprises an arc having a radius equal to the MAXIMUM_RADIUS value, a start angle equal to the FIRST_START_ANGLE value, and an arc angle equal to the MAXIMUM_ARC_ANGLE value.

Yet still further, for any tree configuration, the herein-disclosed method provides a one-to-one correspondence between leaf directories and regions adjacent the circle or arc boundary. By one-to-one correspondence, it is meant that all the leaf directories are represented by regions adjacent the circle or arc boundary, and all regions adjacent the circle or arc boundary represent leaf directories. Thus, a user can easily identify the leaf directories of the tree even if the branches of the tree have different lengths.

Also, for any tree configuration, the area of each region is proportional to the weight of its corresponding directory. If the directories are either equally weighted or unweighted, each of the regions has the same area for any tree configuration.

It is noted that there are various scenarios in which regions having areas strictly unproportional to their weights have areas substantially proportional to their weights. Examples of sources of deviation in areas which still provide substantially proportional areas, but are not limited to, approximations used to display the regions (see the discussion herein of "approximate" and "approximately"), approximations in the mathematical processes used to calculate the areas and/or the parameters which define the regions, and round-off and/or truncation errors in the mathematical processes used to calculate the areas and/or the parameters which define the regions.

It is noted that any values or parameters which are herein-described as being the same or equal can be slightly different, i.e. either about or approximately the same, either about or approximately equal. In a particular example, the inner radius of one or more directories (determined in block 116 in FIG. 9) can be modified to be slightly greater than the outer radius of its parent to mitigate a possibility of radially-overlapping regions. Another way to mitigate radially-overlapping regions comprises modifying the outer radius of one or more directories to be slightly less than the inner radius of each of its children. In either of the above two examples, the inner radius and the outer radius are still considered to be about equal. Similarly, the start angle and/or end angle of each region can be compressed toward the center of its region to mitigate a possibility of angularly-overlapping regions. In this case, angles of angularly adjacent regions are still considered to be about equal. In any of the above examples, the resulting area of the region is still considered to be about monotonically-related and/or about proportional to the weight of its corresponding directory.

A computer program such as a utility program, a file-searching program, a file-opening program, an operating system program, or another program, may include a feature of determining regions/sub-regions to represent directories/files as described above, and outputting a signal to display the regions/sub-regions and/or to make the regions/sub-regions user-selectable. An act may be performed in response to a user-initiated selection of a region or a sub-region. Examples of the act include, but are not limited to, opening a directory or file represented by the selected region or sub-region, processing a file represented by the selected sub-region, and displaying one or more properties of a directory or file represented by the selected region or sub-region. Examples of the one or more properties include, but are not limited to, a date associated with the directory or file (e.g. a last-modified date), a size of the directory or file, a name of the directory or file, a computer address for the directory or file, and a file type.

Optionally, the regions/sub-regions are displayed with different display properties. Examples of the display properties include, but are not limited to, an interior color, an interior fill pattern, a border color, and a border pattern. The display property of a sub-region may be dependent one of the aforementioned properties of its corresponding file. For example, the display property of all files having a particular file type (e.g. .exe) may have corresponding sub-regions having one color, while all files having a different particular file type (e.g. .doc) may have corresponding sub-regions having another color.

The feature can be demonstrated in conjunction with an installation of a computer software product to a computer system. Thus, other computer software products which have the feature can be effectively advertised before, during and/or after the installation process. Visible advertising can be displayed on a display device of the computer system. Audible advertising can be presented by an audio output device (e.g. a speaker or a headphone) of the computer system. A network-based purchase of one or more of the other computer software products may be facilitated in conjunction with the installation process. For example, the installation process may provide a user-selectable button or link to initiate or assist in initiating the purchase.

Figure 10:
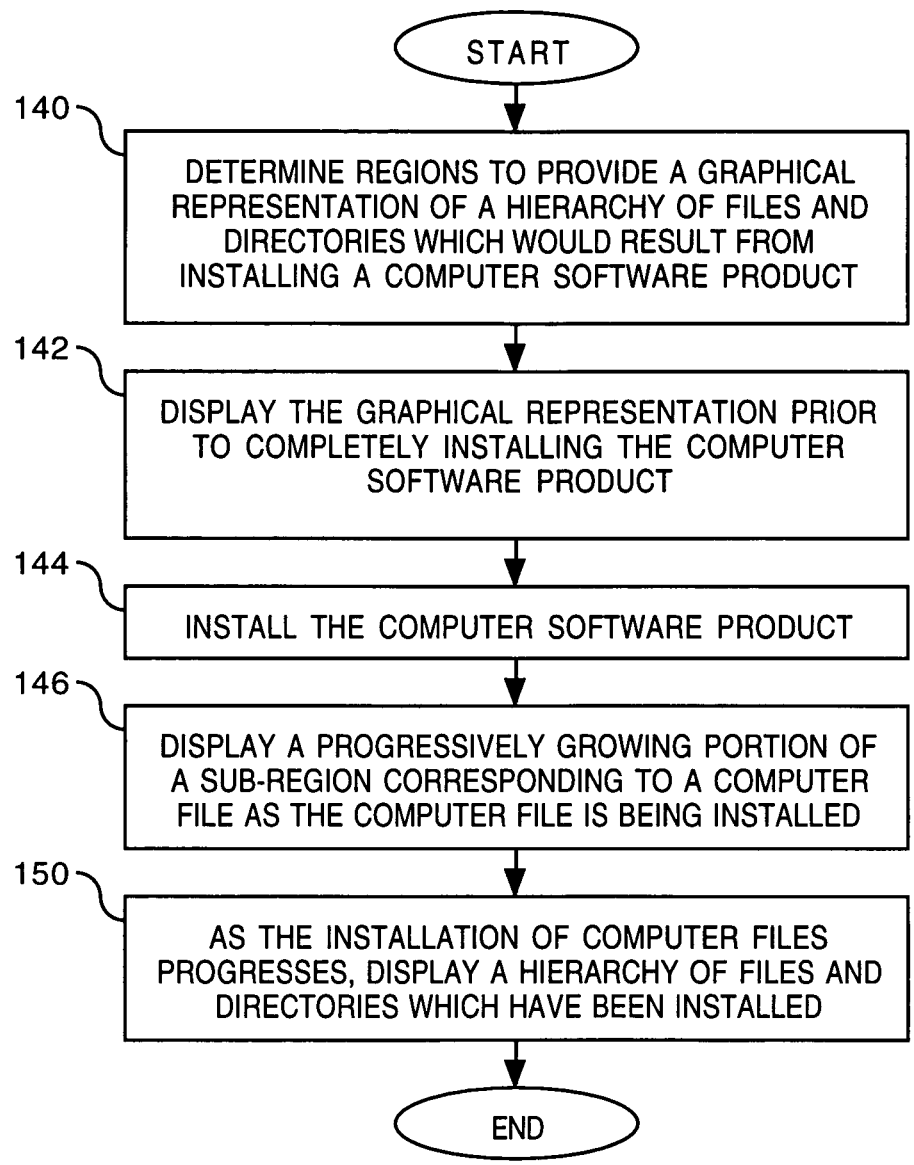
FIG. 10 is a flow chart of an embodiment of a method of providing a preview mode and a progress mode.

The feature can be demonstrated in a preview mode and/or a progress mode of the installation. FIG. 10 is a flow chart of an embodiment of a method of providing the preview mode and the progress mode.

As indicated by block 140, the method comprises determining regions to provide a graphical representation of a hierarchy of files and directories which would result from installing a computer software product to a computer-readable medium of a computer system having a display device. Optionally, the graphical representation is further of a hierarchy of files and directories present on the computer-readable medium prior to installing the computer software product. The regions may be determined as described with reference to FIGS. 7 to 9. Alternatively, the regions may be determined as described in the Lewis patent.

As indicated by block 142, the method comprises displaying with the display device the graphical representation prior to completely installing the computer software product. The graphical representation comprises a plurality of regions, each of the regions representing a corresponding one of the directories which would result from installing the computer software product.

Each of the regions may have a corresponding area based on an amount of space to be occupied on the computer-readable medium by all files to be in its corresponding one of the directories non-inclusive of all subdirectories to be in the corresponding one of the directories. Alternatively, each of the regions may have a corresponding area based on an amount of space to be occupied on the computer-readable medium by its corresponding one of the directories.

The graphical representation may further comprise a plurality of sub-regions. Each of the sub-regions represents one of the files which would result from installing the computer software product. Each of the sub-regions is contained within one of the regions corresponding to a directory which contains its corresponding one of the files. Each of the sub-regions may have a corresponding area based on an amount of space to be occupied on the computer-readable medium by its corresponding one of the files. Each of the sub-regions may be either an annulus sector or a sector of a circle. Alternatively, each of the sub-regions may be a rectangle, such as in the Lewis patent.

The preview mode allows a user to visually determine how the installation will modify the computer-readable medium. If the computer software product has multiple installation options (e.g. a full installation, a standard installation, a minimal installation, a custom installation, a desktop installation, and a notebook installation), multiple graphical representations associated with the multiple installation options may be provided.

As indicated by block 144, the method comprises installing the computer software product. Installing the computer software product comprises installing one or more computer files to the computer-readable medium, and optionally creating a hierarchy of one or more directories.

As a computer file is being installed, the method optionally comprises displaying with the display device a progressively-growing portion of the sub-region corresponding to the file (block 146). The portion may be displayed with a first display property, and a remaining portion may be displayed with a second display property which differs from the first display property.

If the sub-region is shaped as an annulus sector, the portion may also be shaped as an annulus sector. The portion may grow either radially from an inner radius of the annulus sector, or angularly from one of the two line segments defining the annulus sector, as the installation of the computer file progresses. If the sub-region is shaped as a sector of a circle, the portion may also be shaped as a sector of a circle. The portion may grow either radially from a focus point of the sector, or angularly from one of the two radii defining the sector, as the installation of the computer file progresses. If the sub-region is a rectangle, the portion may also be shaped as a rectangle. The portion may grow either horizontally from a side of the rectangle, or vertically from either the top or bottom of the rectangle, as the installation of the computer file progresses.

Regardless of the shape, the area of the region may be monotonically related to the amount of the computer file which has been installed. The area of the region may be proportional to the amount of the computer file which has been installed. When the computer file has been completely installed, the portion comprises a substantially entire portion of the sub-region corresponding to the file.

As the installation of computer files progresses, the method optionally comprises displaying with the display device a graphical representation of a hierarchy of files and directories which have been installed (block 150). Based on the sub-regions determined in block 140, the graphical representation indicates those of the sub-regions associated with installed ones of the files. For example, each of the aforementioned sub-regions may be displayed with either the first display property used to indicated progress of a single file, or a third display property which differs from the first and second display properties.

The graphical representation may further indicate the hierarchy of files and directories present on the computer-readable medium prior to installing the computer software product. In this case, the regions defining the pre-installation files and directories may be displayed with a fourth display property, which may differ from the first, second and third display properties.

Figure 11:
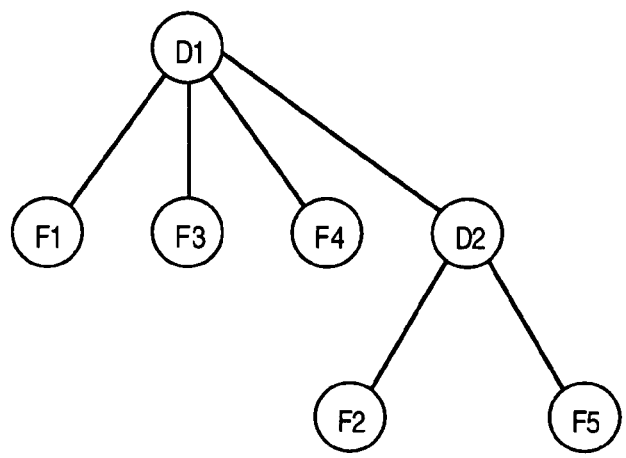
FIG. 11 illustrates an example relationship between files F1, F2, F3, F4 and F5 and directories D1 and D2.

Examples of the preview and progress modes are presented with reference to FIGS. 11-16. Consider a computer system having a hard disk with directories D1 and D2 and files F1 and F2. The directory D2 is a subdirectory of D1. The file F1 is in the directory D1. The file F2 is in the directory D2. Also consider a software product that, when installed, adds files F3 and F4 in the directory D1 and a file F5 in the directory D2. FIG. 11 illustrates the relationship between the files F1, F2, F3, F4 and F5 and the directories D1 and D2.

Figure 12:
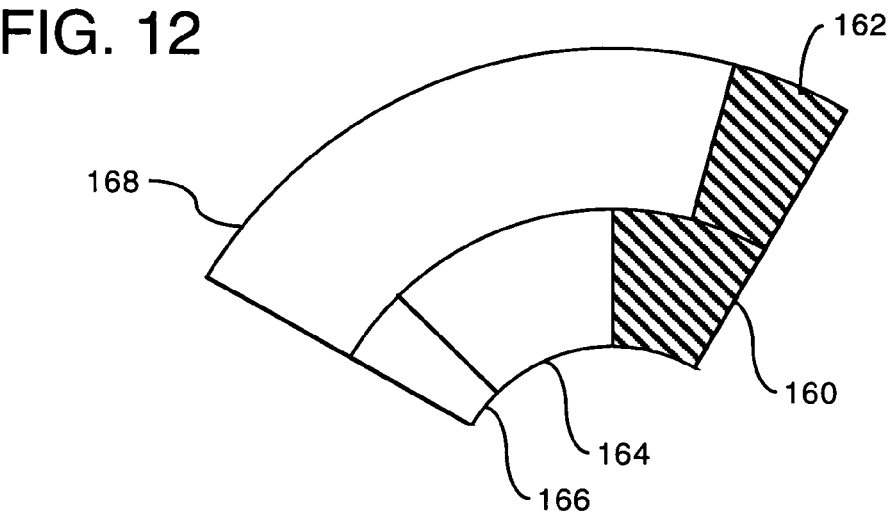
FIG. 12 illustrates an embodiment of a graphical representation provided in the preview mode.

FIG. 12 illustrates an embodiment of a graphical representation provided in the preview mode. The graphical representation comprises annulus sector regions 160, 162, 164, 166 and 168 to represent the files F1, F2, F3, F4 and F5, respectively. The annulus sector regions 160 and 162 are displayed with a first display property to indicate that the files F1 and F2 are stored by the hard drive. The annulus sector regions 164, 166 and 168 are displayed with a second display property to indicate that installation of the computer software product would cause files F3, F4 and F5 to be present on the hard drive.

Figure 13:
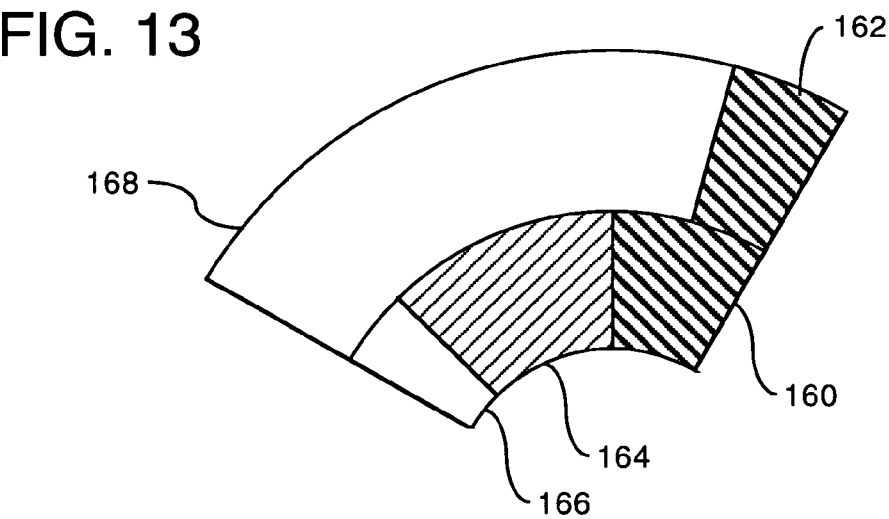
FIG. 13 illustrates an embodiment of a graphical representation provided in the progress mode after the file F3 is installed.
Figure 14:
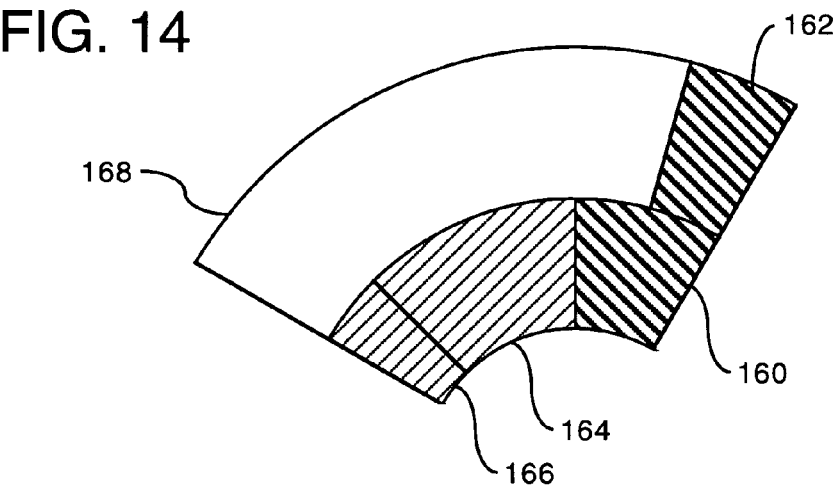
FIG. 14 illustrates an embodiment of a graphical representation provided in the progress mode after the file F4 is installed.

FIG. 13 illustrates an embodiment of a graphical representation provided in the progress mode. After the user initiates the installation of the computer software product, consider that the file F3 is the first file to be installed to the hard drive. After the file F3 has been installed, the annulus sector region 164 is displayed with a third display property indicating same. Next, consider that the file F4 is the second file to be installed to the hard drive. After the file F4 has been installed, the annulus sector region 166 is displayed with the third display property as shown in FIG. 14.

Figure 15:
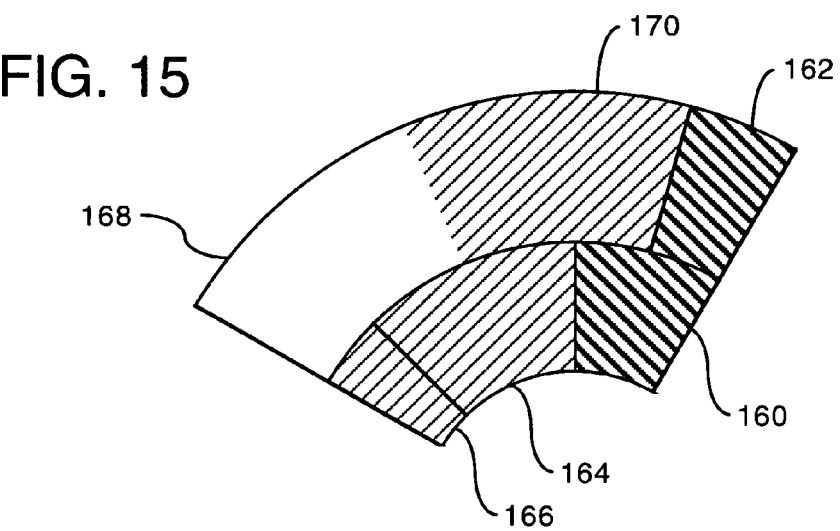
FIG. 15 illustrates a portion of an annulus sector region which grows as installation of the file F5 progresses.
Figure 16:
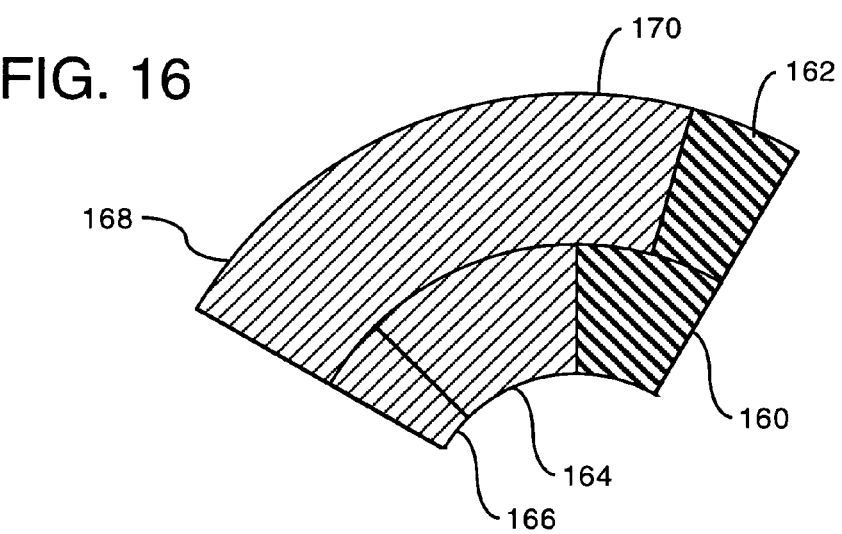
FIG. 16 illustrates an embodiment of a graphical representation provided in the progress mode after the file F5 is installed.

Finally, the file F5 is to be installed to the hard drive. FIG. 15 illustrates a portion 170 of the annulus sector region 168 which grows as installation of the file F5 progresses. The portion 170 shown in FIG. 15 is a snap shot when the file F5 is about halfway installed. After the file F5 has been installed, the portion 170 comprises the entire portion of the annulus sector region 168.

It is noted that the use of progressively-growing portions also may be used for the annulus sector regions 164 and 166 as the files F3 and F4, respectively, are being installed.

A computer system for performing embodiments of the herein-disclosed methods and examples may comprise one or more programmed computers. Each programmed computer may provide a particular functionality implemented using hardware and/or software and/or firmware.

Preferably, a programmed computer includes a computer memory encoded with executable instructions representing a computer program. A processor is responsive to the computer memory to perform a series of specifically identified operations dictated by the computer program. In this way, the computer program can cause the computer to act in a particular fashion.

Examples of the processor include, but are not limited to, a general purpose microprocessor, an application-specific integrated circuit (which may be either standard or custom), one or more discrete logic elements, a digital signal processor, an analog signal processor, one or more circuits, or any combination thereof. It is noted that the processor may be embodied by either a single processing unit or a plurality of processing units. For example, the processor may be embodied by either a single, central processing unit or a plurality of distributed processing units.

Examples of the computer memory include, but are not limited to, an electronic memory, a magnetic memory, an optical memory, and a magneto-optical memory. Examples of an electronic memory include, but are not limited to, a programmable electronic memory and a read-only, hard-wired electronic memory. Examples of a magnetic memory include, but are not limited to, a magnetic disk and a magnetic tape. The magnetic disk may be embodied by a magnetic floppy diskette or a magnetic hard drive, for example. Examples of an optical memory include, but are not limited to, an optical disk. The optical disk may be embodied by a compact disk or a DVD, for example. Regardless of its form, the computer memory may be either read-only, once-writable, or rewritable.

In general, the processor may be responsive to any data structures, computer programs, and signals encoded on a computer-readable medium to perform an embodiment of any of the herein-disclosed methods and examples. Examples of the computer-readable medium include, but are not limited to, computer-readable storage media and computer-readable communication media. Examples of computer-readable storage media are described with reference to the computer memory.

The computer system has a display device to display the visible representations described herein and other visible information to an end user. Examples of the display device include, but are not limited to, a computer monitor, a television, a liquid crystal display, a cathode ray tube, and a gas plasma display.

The computer may receive user input indicating a selection of a region/sub-region from one or more input devices. Examples of the one or more input devices include, but are not limited to, a keyboard, a touch screen, a touch pad, a voice input device, and a pointing device (e.g. a mouse or a pointing stick). The computer processes the user input and/or communicates at least one signal based upon the user input. The display and the one or more input devices facilitate user interaction with the computer.

Embodiments of the herein-disclosed methods and examples can be performed using either a single computer or a plurality of computers. A plurality of computers may cooperate in a client-server fashion, for example, wherein a server computer outputs at least one signal to cause a client computer to display a visible representation and/or to provide a user interface. The plurality of computers may cooperate in a peer-to-peer fashion, for example, wherein one peer computer acts as a server computer and another peer computer acts as a client computer.

The teachings herein can be combined with and/or applied to any of the teachings in U.S. application Ser. No. 09/243,595, which is hereby incorporated by reference in this application.

It will be apparent to those skilled in the art that the disclosed inventions may be modified in numerous ways and may assume many embodiments other than the preferred forms specifically set out and described herein. For example, the acts described with reference to FIGS. 7 to 9 may be executed in an order other than that indicated in FIGS. 7 to 9. Further, some of the acts may be performed in parallel.

Accordingly, it is intended by the appended claims to cover all modifications which fall within the true spirit and scope of the present invention.

What is claimed is:

1. A method comprising:
    installing a first computer software product to a computer system;
    during said installing, using the computer system to advertise a second computer software product other than the first computer software product;
    during said installing, using the computer system to demonstrate a feature of the second computer software product without using the second computer software product or an alternative version of the second computer software product, wherein the feature is responsive to said installing but unnecessary to said installing, wherein said using the computer system to demonstrate the feature of the second computer software product is distinct from said using the computer system to advertise the second computer software product, and wherein the feature comprises displaying a graphical representation of a hierarchy of files and directories; and
    using the computer system to provide a user-selectable button or link to initiate or assist in initiating a network-based purchase of the second computer software product.

2. The method of claim 1 wherein said using the computer system to provide the user-selectable button or link comprises:
    using the computer system to provide the user-selectable button to facilitate the network-based purchase of the second computer software product.

3. The method of claim 1 wherein said using the computer system to provide the user-selectable button or link comprises:
    using the computer system to provide the link to facilitate the network-based purchase of the second computer software product.

4. The method of claim 1 wherein the computer system is to advertise the second computer software product by visibly advertising the second computer software product using a display device during said installing the first computer software product.

5. The method of claim 1 wherein the computer system is to advertise the second computer software product by audibly advertising the second computer software product using an audio output device during said installing the first computer software product.

6. A non-transitory computer-readable storage medium encoded with a computer program, the computer program to cause a computer system, during installing a first computer software product,
    to advertise a second computer software product other than the first computer software product and
    to demonstrate a feature of the second computer software product without using the second computer software product or an alternative version of the second computer software product, wherein the feature is responsive to said installing but unnecessary to said installing, wherein demonstrating the feature of the second computer software product is distinct from advertising the second computer software product, wherein the feature comprises displaying a graphical representation of a hierarchy of files and directories, and wherein the computer system is to provide a user-selectable button or link to initiate or assist in initiating a network-based purchase of the second computer software product.

7. The non-transitory computer-readable storage medium of claim 6 wherein the computer program further causes the computer system to provide the user-selectable button to facilitate the network-based purchase of the second computer software product.

8. The non-transitory computer-readable storage medium of claim 6 wherein the computer program further causes the computer system to provide the link to facilitate the network-based purchase of the second computer software product.

9. The non-transitory computer-readable storage medium of claim 6 wherein the computer program is to cause the computer system to advertise the second computer software product by visibly advertising the second computer software product using a display device during said installing the first computer software product.

10. The non-transitory computer-readable storage medium of claim 6 wherein the computer program is to cause the computer system to advertise the second computer software product by audibly advertising the second computer software product using an audio output device during said installing the first computer software product.

11. An apparatus comprising:
a computer system which, during installing a first computer software product,
advertises a second computer software product other than the first computer software product and
demonstrates a feature of the second computer software product without using the second computer software product or an alternative version of the second computer software product, wherein the feature is responsive to said installing but unnecessary to said installing, wherein demonstrating the feature of the second computer software product is distinct from advertising the second computer software product, wherein the feature comprises displaying a graphical representation of a hierarchy of files and directories, and wherein the computer system is to provide a user-selectable button or link to initiate or assist in initiating a network-based purchase of the second computer software product.

12. The apparatus of claim 11 wherein the computer system provides the user-selectable button to facilitate the network-based purchase of the second computer software product.

13. The apparatus of claim 11 wherein the computer system provides the link to facilitate the network-based purchase of the second computer software product.

14. The apparatus of claim 11 wherein the computer system advertises the second computer software product by visibly advertising the second computer software product using a display device during said installing the first computer software product.

15. The apparatus of claim 11 wherein the computer system advertises the second computer software product by audibly advertising the second computer software product using an audio output device during said installing the first computer software product.

* * * * *